(12) United States Patent
Takahashi et al.

(10) Patent No.: US 6,590,348 B2
(45) Date of Patent: Jul. 8, 2003

(54) DISCHARGE LAMP LIGHTING METHOD AND DISCHARGE LAMP LIGHTING APPARATUS

(75) Inventors: Toru Takahashi, Tokyo (JP); Yutaka Ishihara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/983,160

(22) Filed: Oct. 23, 2001

(65) Prior Publication Data

US 2002/0047643 A1 Apr. 25, 2002

(30) Foreign Application Priority Data

Oct. 24, 2000 (JP) ........................................ 2000-324054

(51) Int. Cl.[7] .............................................. H05B 41/36
(52) U.S. Cl. ................... 315/209 R; 315/246; 315/291; 315/DIG. 5
(58) Field of Search ................................ 315/291, 307, 315/209 R, 246, 247, 224, 225, 360, DIG. 5, DIG. 7

(56) References Cited

U.S. PATENT DOCUMENTS

| | | | | |
|---|---|---|---|---|
| 5,463,287 A | * | 10/1995 | Kurihara et al. ............ | 315/307 |
| 5,828,185 A | * | 10/1998 | Fellows et al. ............. | 315/246 |
| 6,175,200 B1 | * | 1/2001 | Kern ........................... | 315/307 |
| 6,208,089 B1 | * | 3/2001 | Ito et al. ..................... | 315/308 |
| 6,232,725 B1 | | 5/2001 | Derra et al. ............ | 315/209 R |
| 6,239,556 B1 | | 5/2001 | Derra et al. ............ | 315/209 R |
| 6,291,945 B1 | * | 9/2001 | Toyama et al. ............. | 315/307 |
| 6,337,544 B1 | * | 1/2002 | Wang et al. ................ | 315/291 |
| 6,340,870 B1 | * | 1/2002 | Yamashita et al. .......... | 315/308 |

FOREIGN PATENT DOCUMENTS

JP 10-501919 2/1998

* cited by examiner

Primary Examiner—Don Wong
Assistant Examiner—Tuyet T. Vo
(74) Attorney, Agent, or Firm—Oblon, Spivak, McClelland, Maier & Neustadt, P.C.

(57) ABSTRACT

The present invention relates to a discharge lamp lighting method and a discharge lamp lighting apparatus that achieve a reduction in the extent of lamp flickering by adopting a relatively simple circuit structure. A power supply unit 1 supplies AC power (Po) to a discharge lamp 3, and a control unit 2 implements control on the power supply unit 1 so as to gradually increase the instantaneous value of the AC power (Po) during a half cycle ($\tau/2$) of an AC pulse current (Io) as the time elapses from the rise of the half cycle ($\tau/2$) toward an end of the half cycle.

6 Claims, 6 Drawing Sheets

DISCHARGE LAMP LIGHTING METHOD AND DISCHARGE LAMP LIGHTING APPARATUS

BACKGROUND OF THE INVENTION

1. Field of the Invention

The present invention relates to a discharge lamp lighting method and a discharge lamp lighting apparatus adopted to light a discharge lamp by supplying AC power to the discharge lamp. More specifically, it relates to a discharge lamp lighting method and a discharge lamp lighting apparatus that are ideal in applications in which a high-pressure discharge lamp, a high-pressure mercury lamp or an ultra high-pressure mercury lamp is driven by AC power.

2. Background of the Prior Art

It is a known fact that a high-pressure discharge lamp can be driven with a relatively high degree of efficiency by supplying low-frequency AC power with a frequency of, for instance, approximately 50 to 500 Hz to the high-pressure discharge lamp as disclosed in U.S. Pat. No. 4,485,434 and the like.

However, when lighting a high-pressure discharge lamp by supplying AC power, the position at which the discharge arc is generated on an electrode, which depends upon the electrode temperature at the high-pressure discharge lamp and the state of the electrode surface, becomes unstable, resulting in a problematic phenomenon in which the originating point of the discharge arc at the electrode jumps from a given point to another point. This phenomenon manifests as a flickering of the lamp light (lamp flicker).

Published Japanese Translation of PCT International Publication for Patent Application No. 1998-501919 discloses a means for reducing the extent of such lamp flickering. The invention disclosed in this prior art publication is achieved by generating a current pulse having the same polarity as the lamp current over intervals each corresponding to a half cycle of the lamp current and superimposing the current pulse thus generated on the lamp current during the terminal phase of each half cycle of the lamp current to suppress lamp flickering.

However, in the invention disclosed in the prior art publication mentioned above, a current pulse sustained over a specific length of time must be generated in synchronization with the terminal phase of each half cycle of the lamp current and the current pulse thus generated must be superimposed on the lamp current with specific timing. In addition, it is necessary to set a reference value for generating the current pulse. For these reasons, the circuit for generating the current pulse must achieve a highly advanced time management function, which necessitates a complex circuit structure.

SUMMARY OF THE INVENTION

It is an object of the present invention to provide a discharge lamp lighting method and a discharge lamp lighting apparatus achieved through a relatively simple circuit structure, which may be adopted to reduce the extent of lamp flickering.

It is a further object of the present invention to provide a discharge lamp lighting method and a discharge lamp lighting apparatus that contribute to lengthening the service life of a discharge lamp by lessening the extent of electrical shock to the discharge lamp.

In order to achieve the objects described above, in the discharge lamp lighting method according to the present invention, when lighting a discharge lamp by supplying AC power, the AC power is provided as an AC pulse current and an AC pulse voltage, and the discharge lamp is driven by gradually increasing an instantaneous value of the AC power during a half cycle of the AC pulse current over the time elapsing from the rise of the half cycle toward an end of the half cycle.

Since the instantaneous value of the AC power is gradually increased during the half cycle of the AC pulse current supplied to the discharge lamp over the time elapsing from the rise of the half cycle toward an end of the half cycle, the level of the AC power supplied to the discharge lamp reaches the maximum value at the end of each half cycle allowing the temperature of the electrode of the discharge lamp to rise to a high level at the end of the half cycle. This stabilizes the discharge arc and reduces the occurrence of lamp flickering.

The discharge lamp lighting method according to the present invention, in which the instantaneous value of the AC power is gradually increased during the half cycle of the AC pulse current over the time elapsing from the rise of the half cycle toward an end of the half cycle, only requires AC pulse current waveform control to be implemented. It does not necessitate any time management for superimposing the current pulse. As a result, simplification in the circuit structure is achieved. The AC power is controlled so as to achieve the average power level required in the discharge lamp. Thus, the discharge lamp is driven with a high degree of reliability.

In addition, since the instantaneous value of the AC power is gradually increased over the time elapsing from the rise of the half cycle of the AC pulse current toward an end of the half cycle, the extent of the electrical shock to which the discharge lamp is subjected is lessened to contribute to lengthening the service life of the discharge lamp, unlike the prior art technology achieved by superimposing a stepped current pulse on the lamp current.

The present invention also discloses a discharge lamp lighting apparatus employed to implement the discharge lamp lighting method described above. This discharge lamp lighting apparatus comprises a power supply unit and a control unit. The power supply unit supplies AC power to the discharge lamp. The AC power is provided as an AC pulse current and an AC pulse voltage.

The control unit implements control on the power supply unit so as to gradually increase the instantaneous value of the AC power during a half cycle of the AC pulse current over the time elapsing from the rise of the half cycle toward an end of the half cycle.

This discharge lamp lighting apparatus, which clearly may be utilized to implement the discharge lamp lighting method according to the present invention, is capable of stabilizing the discharge arc and reducing the occurrence of lamp flickering. In addition, since it does not require any time management and requires only AC pulse current waveform control, simplification of the circuit structure is achieved.

The present invention further discloses specific circuit structure examples that may be adopted in the discharge lamp lighting apparatus. Other objects, structural features and advantages of the present invention are explained in further detail by referring to the attached drawings. The drawings simply present examples.

DETAILED DESCRIPTION OF THE INVENTION

Figure 1:
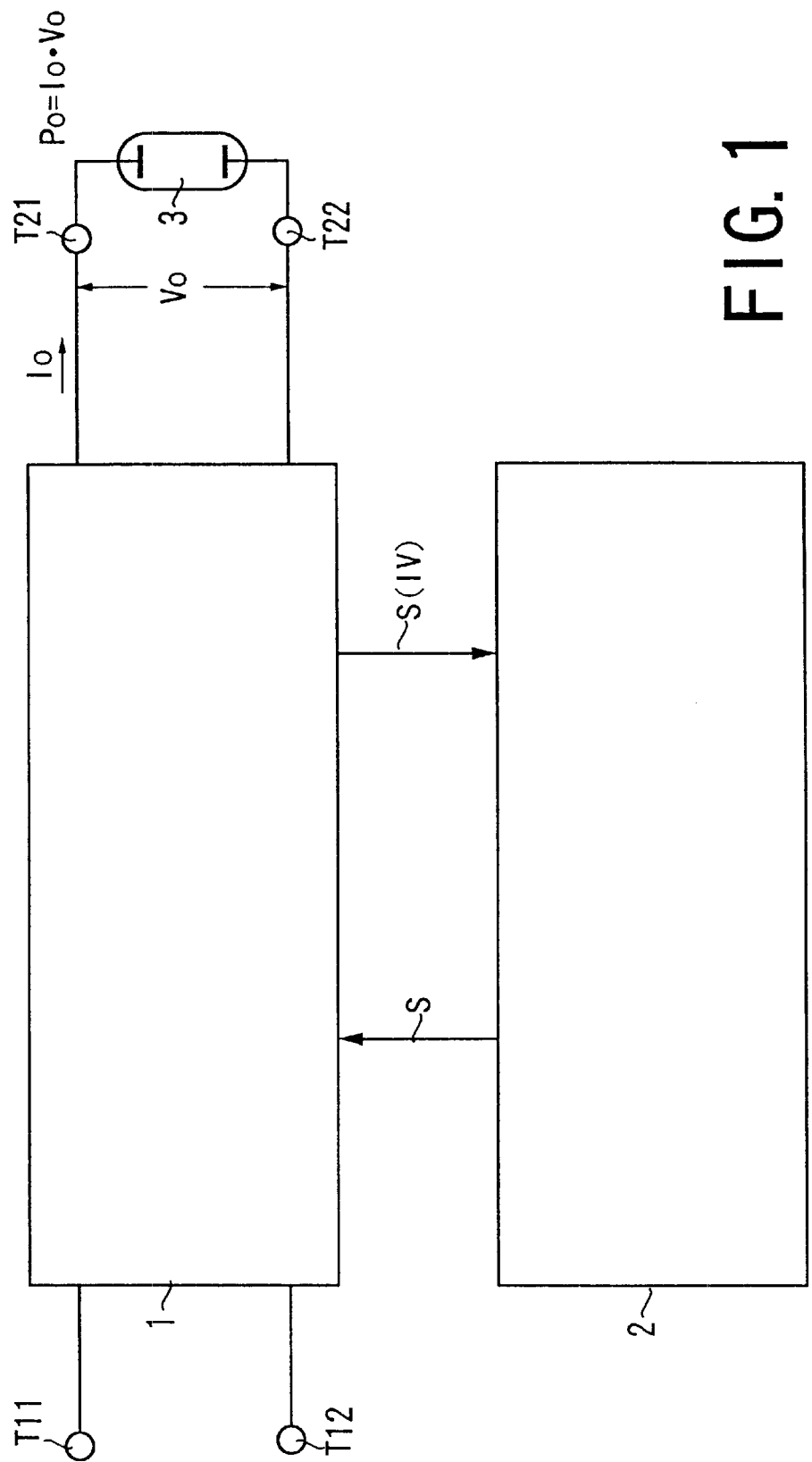
FIG. 1 is a block diagram of the structure adopted in the discharge lamp lighting apparatus according to the present invention.

FIG. 1 is a block diagram of the structure of the discharge lamp lighting apparatus according to the present invention. The discharge lamp lighting apparatus in the figure comprises a power supply unit 1 and a control unit 2. The power supply unit 1 supplies AC power (Po) to a discharge lamp 3. DC power is normally supplied to input terminals (T11) and (T12) of the power supply unit 1. The power supply unit 1 converts this DC power to AC power at its internal power conversion circuit and supplies the resulting AC power to output terminals (T21) and (T22). The discharge lamp 3, with its two ends connected to the output terminals (T21) and (T22), receives the AC power (Po) supplied from the output terminals (T21) and (T22). If the power supply unit 1 is provided with a power conversion circuit for converting an alternating current to a direct current on its input side, AC power may be input to the input terminals (T11) and (T12).

Figure 2:
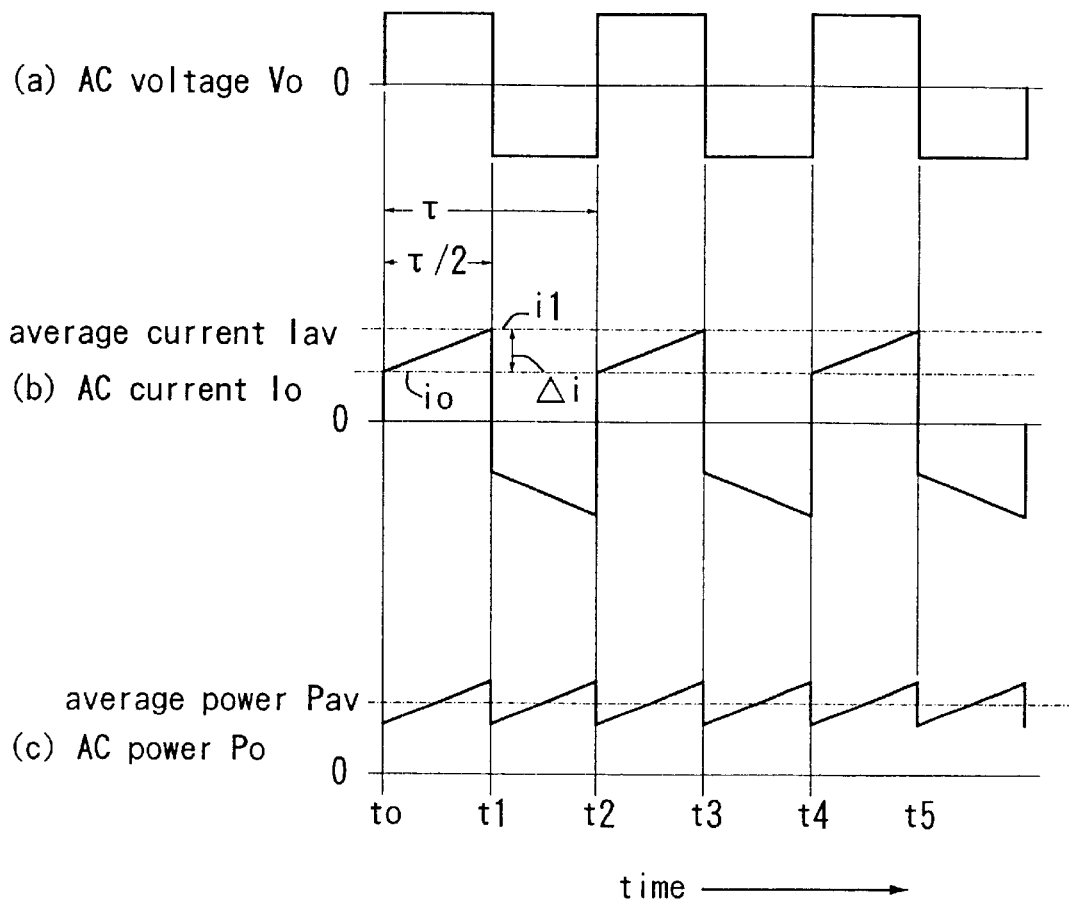
FIG. 2 illustrates waveforms of the AC voltage, the AC current and the AC power supplied to the discharge lamp.

FIG. 2(a) shows the waveform of the AC voltage (Vo) supplied to the discharge lamp 3, FIG. 2(b) likewise shows the waveform of an AC pulse current (Io) supplied to the discharge lamp 3 and FIG. 2(c) shows the waveform of the AC power (Po).

As shown in the figures, the AC power (Po) is provided as the AC pulse current (Io) and the AC pulse voltage (Vo). The frequencies of the AC pulse current (Io) and the AC pulse voltage (Vo) may be set within a range of, for instance, 50 to 500 Hz.

The control unit 2 implements control (S) on the power supply unit 1, whereby the instantaneous value of the AC power (Po) is gradually increased during a half cycle ($\tau/2$) of the AC pulse current (Io) over the time elapsing from the rise of the half cycle ($\tau/2$) toward an end of the half cycle.

The voltage applied to the discharge lamp 3 is largely determined based upon the type of the discharge lamp 3. As shown in FIG. 2(a), the AC voltage (Vo) applied to the discharge lamp 3 manifests as a rectangular wave having an almost constant instantaneous value (absolute value). If the instantaneous value (absolute value) of the AC voltage (Vo) is almost constant, the control on the waveform of the AC power (Po) described above may be achieved by gradually increasing the instantaneous value (absolute value) of the AC pulse current (Io) over the time elapsing from the rise of the half cycle ($\tau/2$) toward an end of the half cycle. For instance, during the half cycle ($\tau/2$) elapsing from a time point (to) to a time point (t1), the instantaneous value (Io) at the time point (to) (at the rise) is increased by ($\Delta i$) to the instantaneous value (i1) at the time point (t1) (at the end).

The instantaneous value is increased in a similar manner during a half cycle ($\tau/2$) elapsing from the time point (t1) to a time point (t2), during a half cycle ($\tau/2$) elapsing from the time point (t2) to a time point (t3), during a half cycle ($\tau/2$) elapsing from the time point (t3) to a time point (t4), during a half cycle ($\tau/2$) elapsing from the time point (t4) to a time point (t5) and so forth. It is to be noted that during a negative half cycle, e.g., during the half cycle elapsing from the time point (t1) to the time point (t2), the instantaneous value of the AC pulse current (Io) is handled as the absolute value.

The only requirement imposed with regard to the characteristics whereby the power increases is that the power instantaneous value must increase gradually as the time elapses, and accordingly, may manifest a curved increase instead of the simple increase shown in the figures. It is to be noted, however, that any power waveform attributable to a spiked waveform that may manifest at the rise of the AC pulse current (Io) is disregarded.

As explained above, since the instantaneous value of the AC power (Po) is gradually increased during the half cycle ($\tau/2$) of the AC pulse current (Io) supplied to the discharge lamp 3 as the time elapses toward the rise of the half cycle ($\tau/2$) toward an end of the half cycle in the discharge lamp lighting method and the discharge lamp lighting apparatus according to the present invention, the level of the AC power (Po) supplied to the discharge lamp 3 reaches its maximum value at the end of each half cycle ($\tau/2$) to allow the temperature of the electrode of the discharge lamp 3 to reach a high level at the end of the half cycle ($\tau/2$). As a result, the discharge arc is stabilized and the occurrence of lamp flickering is reduced.

As the instantaneous value of the AC power (Po) is gradually increased during the half cycle ($\tau/2$) of the AC pulse current (Io) over the time elapsing from the rise of the half cycle ($\tau/2$) toward an end of the half cycle and the discharge lamp lighting method according to the present invention, the extent of the electrical shock to the discharge lamp 3 is lessened compared to the extent of the electrical shock to which the discharge lamp 3 would be subjected when a stepped current is supplied. Thus, the service life of the discharge lamp 3 can be lengthened.

Furthermore, since only the waveform of the AC power (Po) needs to be controlled and the time management required when superimposing a current pulse on the lamp current is no longer necessary, the circuit structure is simplified.

In the embodiment presented in the figures, the waveform of the AC power (Po) is controlled by controlling the waveform of the AC pulse current (Io). While similar control may be achieved in theory by controlling the waveform of the AC pulse voltage (Vo) that constitutes another element that determines the level of the AC power (Po), the level of the voltage applied to the discharge lamp 3 is largely determined by the type of the discharge lamp 3. Accordingly, it is more practical to implement control on the waveform of the AC pulse current (Io).

The average value (Iav) (see FIG. 2(b)) of the AC pulse current (Io) is controlled so that it achieves the level of the average power (Pav) (see FIG. 2(c)) required in the discharge lamp 3. As a result, the discharge lamp 3 is driven with a high degree of reliability.

According to the present invention, the waveform of the AC power (Po) is controlled. For this purpose, a detection signal S(IV) that contains power information is supplied from, for instance, the power supply unit 1 to the control unit 2 (see FIG. 1).

Figure 3:
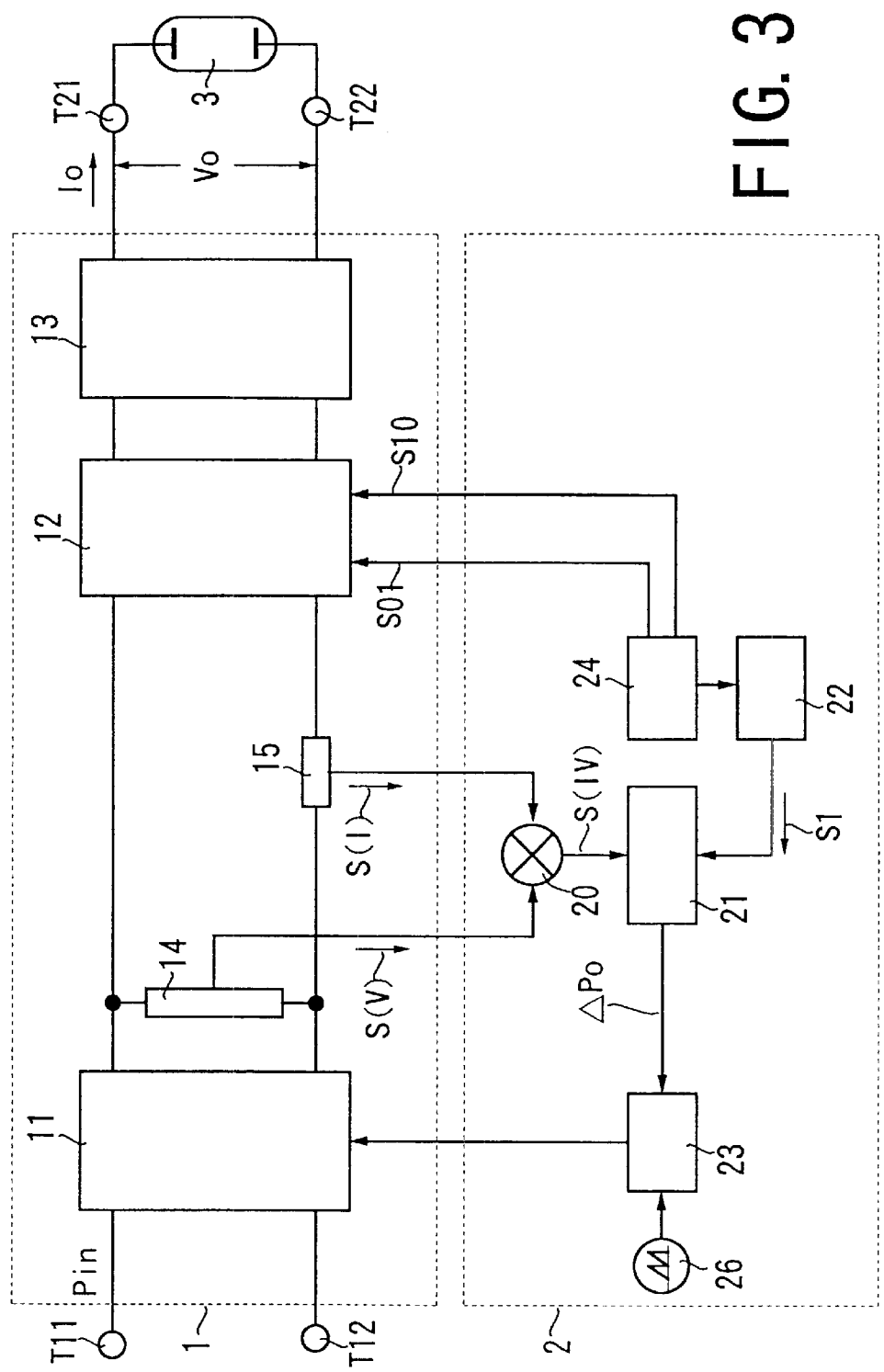
FIG. 3 is a block diagram showing a specific embodiment of the discharge lamp lighting apparatus according to the present invention.

FIG. 3 is a block diagram presenting a specific example of implementation of the discharge lamp lighting apparatus according to the present invention. In the discharge lamp lighting apparatus in the figure, the power supply unit 1, which includes a converter 11 and an inverter 12, is further provided with a high-voltage generating unit 13.

The converter 11 switches an input DC power (Pin) applied to the input terminal (T11) or (T12) and outputs the switching output by converting it to DC power. The switching frequency at the converter 11 may be set at a value within a range of, for instance, 10 to 500 kHz.

The inverter 12 converts the DC power output from the converter 11 to AC power and outputs the AC power resulting from the conversion. The inverter 12, which is constituted as a type of rectangular wave generating circuit, generates a rectangular AC pulse current and a rectangular AC pulse voltage. The inverter 12 is driven by drive pulse signals (S10) and (S01) provided from an inverter drive circuit 24. The drive pulse signal (S10) which is obtained by inverting the drive pulse signal (S01) is set to low level (logic value 0) when the drive pulse signal (S01) is at high level (logic value 1), and is set to a high level (logic value 1) the drive pulse signal (S01) is at low level (logic value 0). In addition, a period over which both the drive pulse signals (S01) and (S10) are sustained at high level as they are switched is set. Alternatively, a period over which both the drive pulse signals (S01) and (S10) are sustained at low level as they are switched instead of at high level may be set.

The switching frequency at the inverter 12, which is determined by the drive pulse signals (S01) and (S10), is selected at a value smaller than the switching frequency of the converter 11. For instance, the switching frequency at the converter 11 may be selected at a value within a 10 to 500 kHz range whereas the switching frequency at the inverter 12 may be selected at a value within a 50 to 500 Hz range.

In the embodiment, the power supply unit 1 is further provided with the high-voltage generating unit 13 at a stage rearward of the inverter 12. The high-voltage generating unit 13 generates a voltage achieving a value required to light the discharge lamp 3 and supplies the voltage to the output terminals (T21) and (T22).

The control unit 2 includes a power calculating unit 20, a command signal-generating unit 22, a signal-generating unit 21 and a pulse width control unit 23. The power calculating unit 20, through an arithmetic operation, calculates the power level in correspondence to a voltage detection signal S(V) and a current detection signal S(I) and generates a power detection signal S(IV).

The voltage detection signal S(V) is obtained by detecting with a voltage detection circuit 14 the voltage manifesting on the output side of the converter 11. The output voltage at the converter 11 is a DC voltage, but also contains voltage information with regard to the AC pulse voltage (Vo) supplied to the discharge lamp 3. Accordingly, the voltage detection signal S(V) can be utilized as output voltage information.

The current detection signal S(I) is obtained by detecting with a current detection circuit 15 the current flowing through a power supply line. The current flowing through the power supply line is essentially equivalent to the AC pulse current (Io) flowing to the discharge lamp 3. Accordingly, the current detection signal S(I) can be utilized as information regarding the AC pulse current (Io).

The command signal-generating unit 22 generates command signal (S1) whose instantaneous value gradually increases as the time elapses. In more specific terms, the command signal (S1) has an instantaneous value which gradually increases over the time elapsing from the rise of the half cycle ($\tau/2$) of the AC pulse current (Io) toward an end of the half cycle. In the embodiment in the figure, the command signal-generating unit 22 generates the command signal (S1) which is synchronous with the drive pulse signals (S01) and (S10) by using the drive pulse signals (S01) and (S10). Since the command signal (S1) achieves a triangular (sawtooth) waveform in the embodiment shown in the figure, the command signal (S1) is hereafter referred to as a triangular wave command signal (S1).

The triangular wave command signal (S1) from the command signal-generating unit 22 as well as the power detection signal S(IV) from the power calculating unit 20 are provided to the signal-generating unit 21. The signal-generating unit 21 then outputs a signal ($\Delta$Po) corresponding to the error manifested by the power detection signal S(IV) relative to the triangular wave command signal (S1).

The pulse width control unit 23 implements pulse width control on the converter 11 based upon the signal ($\Delta$Po) provided from the signal-generating unit 21. More specifically, the pulse width control unit 23 having a triangular wave oscillation circuit 26 generates a signal with a pulse width corresponding to the signal ($\Delta$Po) by using a triangular wave signal provided from the triangular wave oscillation circuit 26 and the signal ($\Delta$Po) provided from the signal-generating unit 21 and provides the signal thus generated to the converter 11 to control the switching operation of the converter 11.

When the converter 11 engages in a switching operation in conformance to the pulse width control described above, the voltage and the current manifesting on the output side of the converter 11 are detected by the voltage detection circuit 14 and the current detection circuit 15. The voltage detection signal S(V) and current detection signal S(I) are provided to the power calculating unit 20 which, in response provides the power detection signal S(IV) to the signal-generating unit 21. This power detection signal S(IV) is compared with the triangular wave command signal (S1) at the signal-generating unit 21 and the signal ($\Delta$Po) corresponding to the error is generated. Accordingly, the pulse width control unit 23 implements the pulse width control on the converter 11 in conformance to the signal ($\Delta$Po). The pulse width control is implemented at this time along the direction in which the error of the power detection signal S(IV) relative to the triangular wave command signal (S1) is reduced.

Through the feedback control described above, control whereby the error of the power detection signal S(IV) relative to the triangular wave command signal provided from the triangular wave oscillation circuit 26 is reduced to zero is achieved. In other words, the waveform identical to that of the triangular wave command signal (S1) is achieved for the power detection signal S(IV). Since the voltage information among the voltage information and the current information contained in the power detection signal S(IV), which is determined by the tube voltage at the discharge lamp 3, is almost constant, the waveform of the AC pulse current (Io) is allowed to have waveform characteristics identical to those of the triangular wave command signal (S1) in reality. In other words, the waveform whereby the instantaneous value ($\Delta$i) of the AC pulse current (Io) gradually increases during the half cycle ($\tau/2$) of the AC pulse current (Io) over time from the rise of the half cycle ($\tau/2$) toward the end of the half cycle is achieved.

Figure 4:
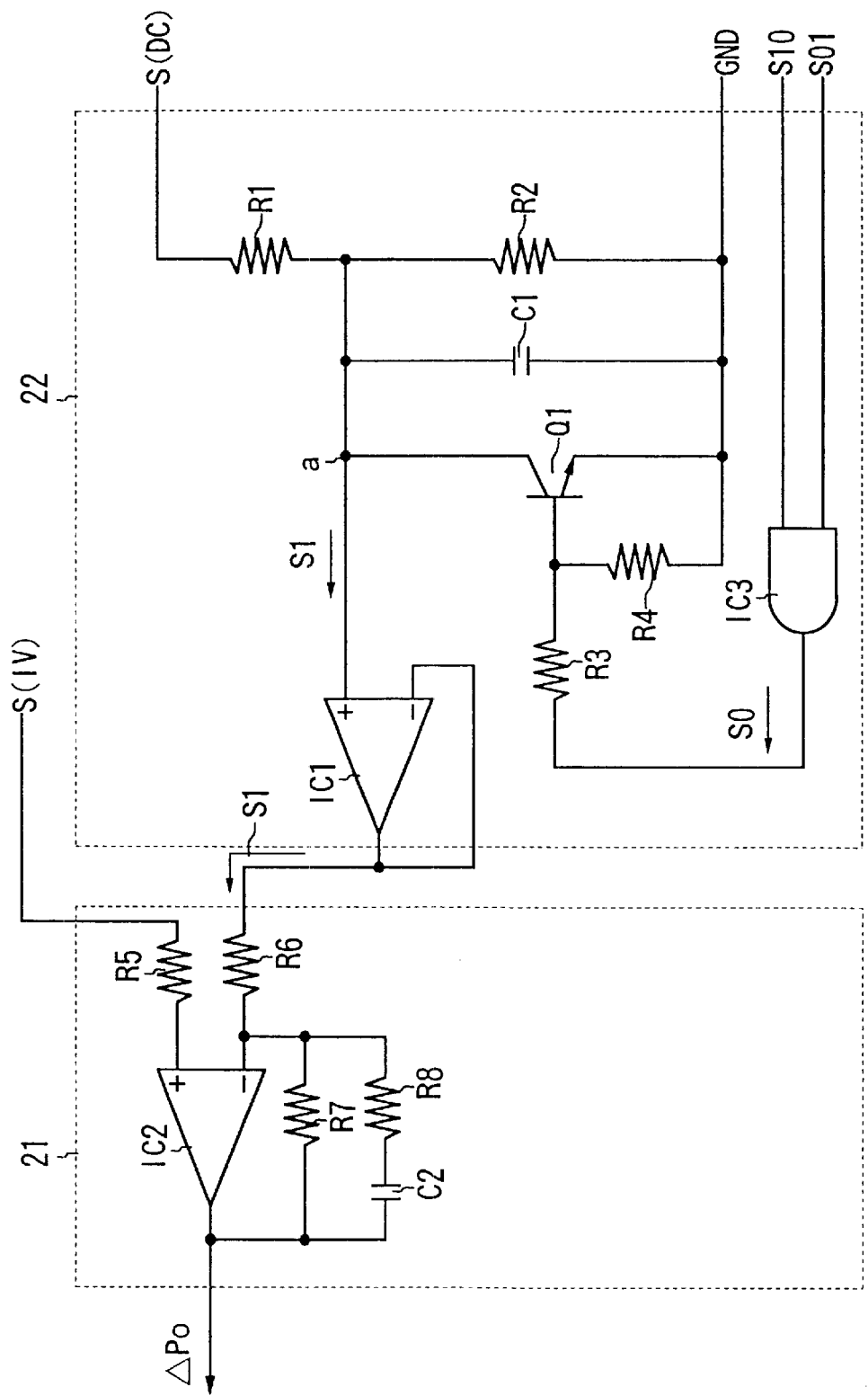
FIG. 4 is an electrical circuit diagram showing specific circuit structures that may be adopted at the signal-generating unit and the command signal-generating unit in the discharge lamp lighting apparatus in FIG. 3.

FIG. 4 is an electrical circuit diagram showing specific circuit structures that may be adopted at the signal-generating unit 21 and the command signal-generating unit 22 included in the discharge lamp lighting apparatus shown in FIG. 3. The command signal-generating unit 22 includes a transistor (Q1), an AND gate (IC3) and a buffer (IC1).

A capacitor (C1) is connected between the collector and the emitter of the transistor (Q1). One end of a resistor (R1) and also one end of a resistor (R2) are connected to the collector and the connecting point where the collector and the capacitor (C1) are connected. A DC voltage S(DC) is supplied to the other end of the resistor (R1), whereas the other end of the resistor (R2) is connected to the connecting point where the capacitor (C1) is connected with the emitter of the transistor (Q1). A resistor (R4) is connected between the base and the emitter of the transistor (Q1), with one end of a resistor (R3) connected to the connecting point where one end of the resistor (R4) is connected to the base.

The drive to pulse signals (S10) and (S01) are respectively provided to one of the two input terminals of the AND gate (IC3). In conformance to the rises and falls of the drive pulse signals (S10) and (S01), the AND gate (IC3) generates a pulse signal (S0) having a very small pulse width. The other end of the resistor (R3) is connected to the output end of the AND gate (IC3). Thus, the pulse signal (S0) generated at the AND gate (IC3) is provided to the base of the transistor (Q1) via the resistor (R3).

The input terminal (+) of the buffer (IC1) is connected to the connecting point where the collector of the transistor (Q1) and the capacitor (C1) are connected to each other.

The signal-generating unit 21 is provided with an operational amplifier (IC2). The triangular wave command signal (S1) generated at the command signal-generating unit 22 is provided via a resistor (R6) to an input terminal (−) of the operational amplifier (IC2), whereas the power detection signal S(IV) is input via a resistor (R5) to an input terminal (+). A resistor (R7) and a serial circuits constituted of a resistor (R8) and a capacitor (C2) are connected between the input terminal (−) and the output terminal of the operational amplifier (IC2).

Figure 5:
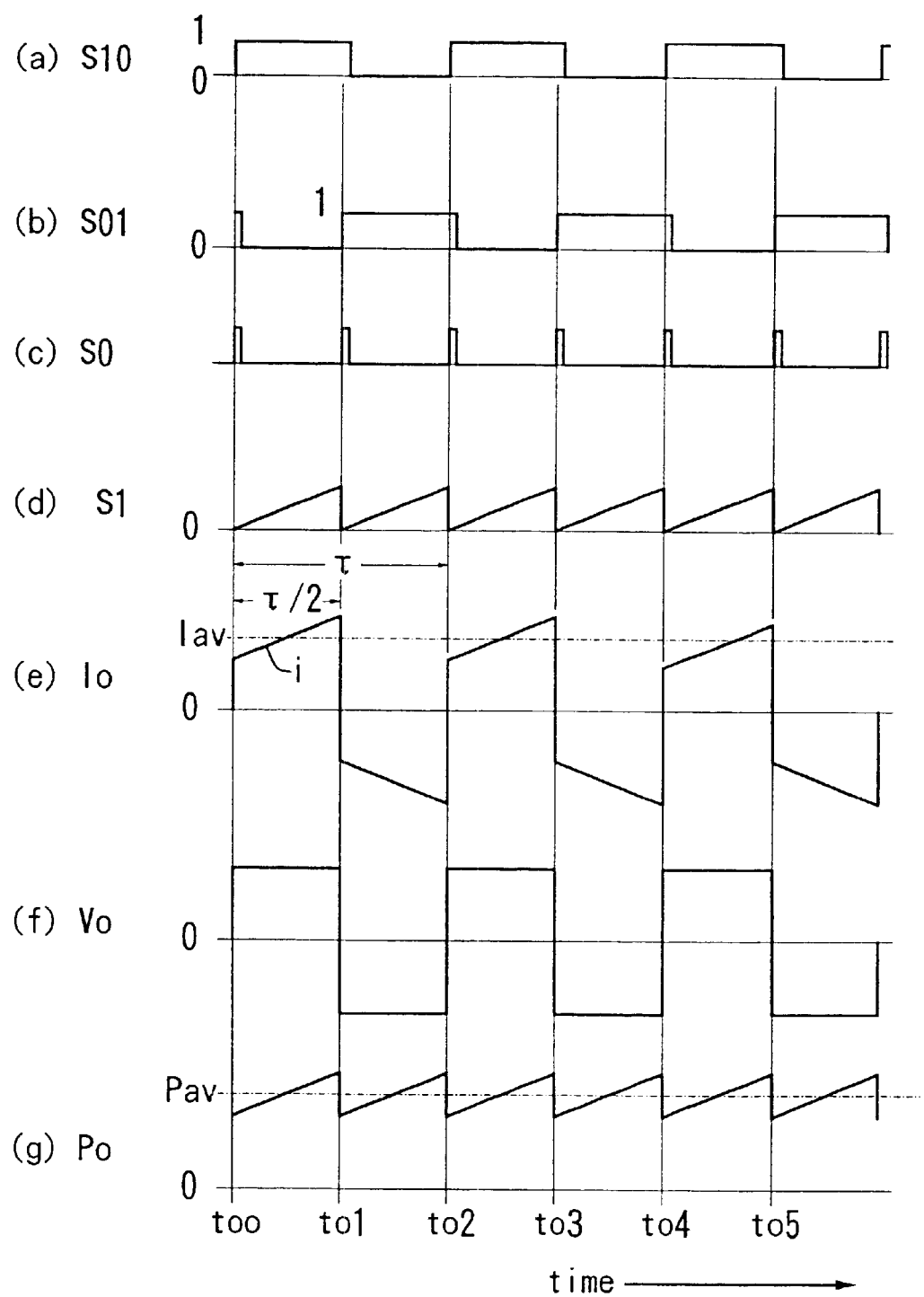
FIG. 5 are waveform diagrams provided to facilitate an explanation of the circuit operations performed at the signal-generating unit and the command signal-generating unit shown in FIG. 4.

Next, the circuit operations performed at the signal-generating unit 21 and the command signal-generating unit 22 in FIG. 4 are explained in reference to FIG. 5. As shown in FIGS. 5(a) and 5(b), a period over which both the drive pulse signals (S10) and (S01) are sustained at high level as they are switched is set. As a result, after the drive pulse signals (S10) and (S01) are provided to the AND gate (IC3), a pulse signal (S0) having an extremely small pulse width is generated as shown in FIG. 5(c) while the drive pulse signal (S10) undergoes a fall (or a rise) and the drive pulse signal (S01) undergoes a rise (or a fall).

As this pulse signal (S0) is provided to the base of the transistor (Q1) at a time point (too), the transistor (Q1) is turned on. As a result, the potential at one end (a) of the capacitor (C1) connected to the collector of the transistor (Q1) is set almost to the ground level (0) as shown in FIG. 5(d) at the time point (too). Since the pulse signal (S0) becomes dissipated after a very short time, the transistor Q1 is turned on only for a very short period of time and then is turned off.

Once the transistor (Q1) is turned off, the capacitor (C1) is charged with the DC voltage S(DC) supplied via the resistor (R1), resulting in the terminal voltage at the one end (a) of the capacitor (C1) rising as shown in FIG. 5(d). The rising slope along which the voltage at the one end (a) of the capacitor (C1) increases is determined in conformance to the time constants of the capacitor (C1) and the resistor (R1).

The terminal voltage at the one end (a) of the capacitor (C1) keeps increasing until immediately before a time point (to1) at which the pulse signal (S0) next shifts to high level. Then, as the pulse signal (S0) shifts to high level at the time point (to1) to turn on the transistor (Q1), the potential at the one end (a) of the capacitor (C1) is set almost to the ground level (0).

Through this repetitive operation, the triangular wave (sawtooth wave) signal (S1) shown in FIG. 5(d) is generated. The triangular wave command signal (S1) achieves accurate synchronization with the drive pulse signals (S10) and (S01) provided to the inverter 12.

The triangular wave command signal (S1) is provided via the buffer (IC1) to the input terminal (−) of the operational amplifier (IC2) constituting the signal-generating unit 21. At the operational amplifier (IC2), the error manifesting between the triangular wave command signal (S1) provided to the input terminal (−) and the power detection signal S(IV) provided to the input terminal (+) is amplified. As a result, the signal (ΔPo) corresponding to the error between the triangular wave command signal (S1) and the power detection signal S(IV) provided to the input terminal (+) is output from the signal-generating unit 21. This signal (ΔPo) is provided to the pulse width control unit 23, a control signal achieving a pulse width corresponding to the value indicated by the signal (ΔPo) is provided from the pulse width control unit 23 to the converter 11 and the pulse width control is implemented along the direction in which the error manifested by the power detection signal S(IV) relative to the triangular wave command signal (S1) is reduced, as explained earlier.

Through the feedback operation described above, a control operation is performed at the operational amplifier (IC2) so as to eliminate the error between the triangular wave command signal (S1) provided to the input terminal (−) and the power detection signal S(IV) provided to the input terminal (+). As a result, the waveform identical to that of the triangular wave command signal (S1) is achieved for the AC pulse current (Io), as illustrated in FIGS. 5(d) and 5(e). Namely, the AC pulse current (Io) achieves a waveform whereby its instantaneous value (Δi) gradually increases over time during the half cycle (τ/2) from the rise (too) of the half cycle (τ/2) to the end (to1). FIG. 5f shows the waveform of the AC pulse voltage and FIG. 5(g) shows the waveform of the AC power.

Figure 6:
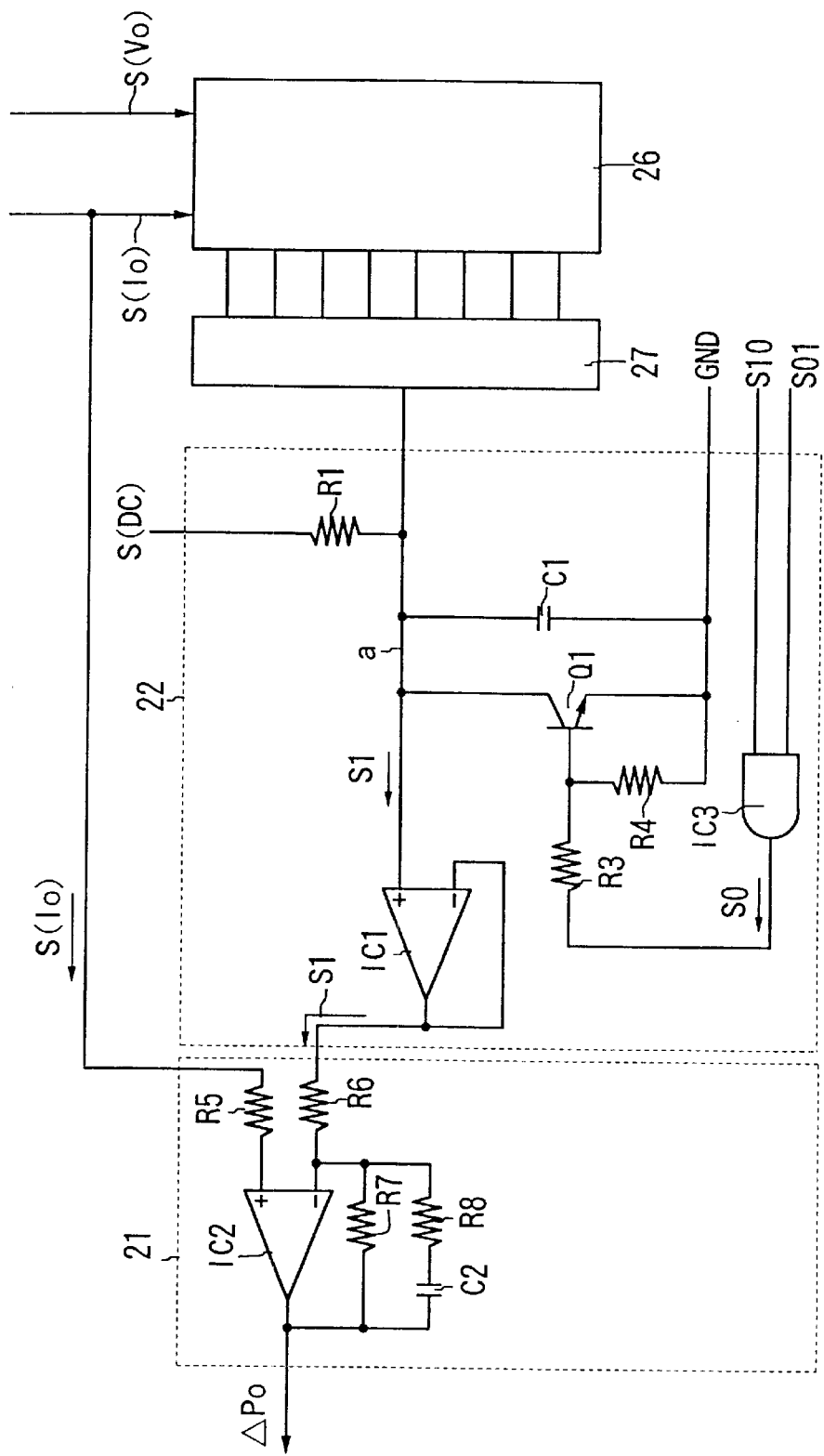
FIG. 6 illustrates another example of the control unit that may be employed in the discharge lamp lighting apparatus according to the present invention.

FIG. 6 shows another example of the control unit that may be employed in the discharge lamp lighting apparatus according to the present invention. In the figure, the same reference numerals are assigned to components identical to those shown in FIG. 4. In this embodiment, the current detection signal S(I) and the voltage detection signal S(V) are input to a digital signal-processing unit 26. The digital signal-processing unit 26 digitally calculates the level of the power in conformance to the current detection signal S(I) and the voltage detection signal S(V). The digital signal-processing unit 26 also outputs a digital signal, the level of which corresponds to the difference between the digitally calculated power level and the target power level. This digital signal is converted to an analog quantity at a digital/analog conversion unit 27 and then the analog value thus obtained is provided to the command signal-generating unit 22.

The current detection signal S(I) is provided to the input terminal (+) of the operational amplifier (IC2) included in the signal-generating unit 21, and the error between the current detection signal S(I) and the triangular wave command signal (S1) generated at the command signal-generating unit 22 is amplified at the operational amplifier (IC2), thereby obtaining the signal (ΔPo), the value of which corresponds to the error. While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

As explained above, the present invention achieves the following advantages.

A discharge lamp lighting method and a discharge lamp lighting apparatus for reducing the extent of lamp flickering can be provided by adopting a relatively simple circuit structure.

A discharge lamp lighting method and a discharge lamp lighting apparatus that contribute to lengthening the service life of a discharge lamp by reducing the extent of electrical shock can be provided.

What is claimed is:

1. A discharge lamp lighting method, comprising the steps of:

supplying an AC power to a discharge lamp, said AC power including an AC pulse current and an AC pulse voltage; and exciting said discharge lamp by gradually increasing an instantaneous value of said AC power during a half cycle of said AC pulse current over substantially all of a time elapsing from a rise of said half cycle toward an end of said half cycle.

2. The discharge lamp lighting method of claim 1, further comprising the step of:

controlling said AC pulse current so as to achieve an average power level required by said discharge lamp.

3. A discharge lamp lighting apparatus, comprising:

a power supply unit supplying an AC power to a discharge lamp, said AC power including an AC pulse current and an AC pulse voltage,; and a control unit implementing control on said power supply unit so as to gradually increase an instantaneous value of said AC power during a half cycle of said AC pulse current over substantially all of a time elapsing from a rise of said half cycle toward an end of said half cycle.

4. The discharge lamp lighting apparatus of claim 3, wherein:

said control unit controls said AC pulse current so as to achieve an average power level required by said discharge lamp.

5. The discharge lamp lighting apparatus of any one of claims 3 and 4, wherein:

said power supply unit includes:

a converter that switches an input DC power and outputs a DC power that is obtained by converting a switching output; and an inverter that outputs an AC power that is obtained by converting said DC power that is output from said converter to said AC power; and said control unit includes:

a power calculating unit that generates a power detection signal by calculating power that is in conformance to a voltage detection signal and a current detection signal that are detected on an output side of said converter;

a command signal-generating unit that generates a command signal that has an instantaneous value that gradually increases over time;

a signal-generating unit that is provided with said power detection signal and said command signal and outputs a signal that indicates a value that corresponds to an error manifested by said power detection signal relative to said command signal; and a pulse width control unit that implements pulse width control on said converter in conformance to said signal provided from said signal-generating unit.

6. The discharge lamp lighting apparatus of claim 5, wherein:

said command signal-generating unit generates a command signal that is synchronous with a drive pulse signal of said converter.

* * * * *